Figure 1:
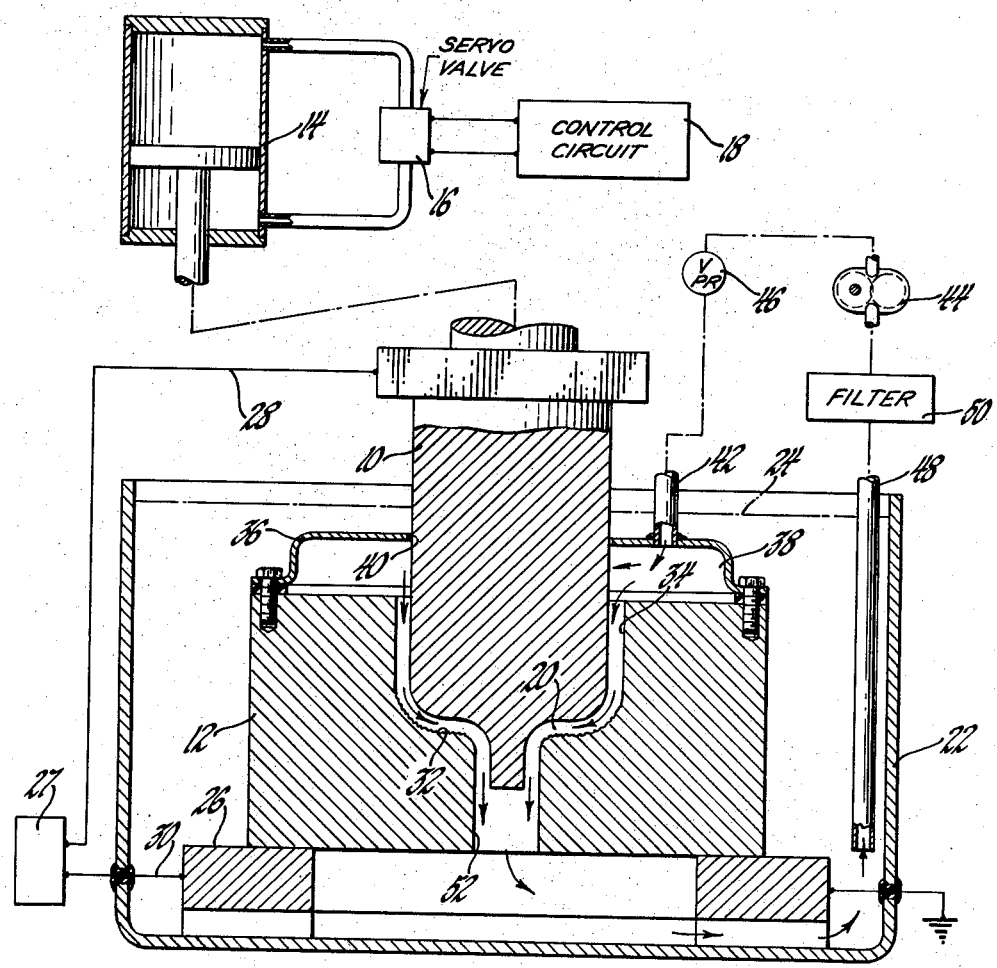

Aug. 11, 1964  D. H. HILL  3,144,541
ELECTRICAL STOCK REMOVAL APPARATUS
Filed July 13, 1961

INVENTOR.
David H. Hill
BY
Hugh L. Fisher
ATTORNEY

United States Patent Office 3,144,541
Patented Aug. 11, 1964

3,144,541
ELECTRICAL STOCK REMOVAL APPARATUS
David H. Hill, Birmingham, Mich., assignor to General Motors Corporation, Detroit, Mich., a corporation of Delaware
Filed July 13, 1961, Ser. No. 123,830
9 Claims. (Cl. 219—69)

This invention relates to improvements in electrical stock removal apparatus.

As is well known, in the process, commonly referred to as electric discharge machining, a series of time spaced electrical discharges are generated across a gap formed between cutting tool and workpiece electrodes. These electrical discharges take place in the presence of an ionizable fluid and cause particles to be eroded from the workpiece in accordance with a certain plan or scheme usually determined by the configuration of the cutting tool. Because of the nature of the process, it can be utilized to machine very hard materials and therefore has found acceptance in the fabrication of dies. Necessarily, dies have rather high accuracy requirements and any deviations from these requirements usually render the dies useless.

One source of inaccuracy attributed to commercially available electrical stock removal apparatus is that from contaminated dielectric fluid, i.e., the dielectric fluid containing the eroded particles. Exemplary of the problem is the machining of a die having a thru-opening. If the contaminated dielectric fluid having the eroded particles flows from the machining gap and then past previously machined surfaces, several objectionable things happen. An undesired taper results along the machined surfaces due to so-called "secondary erosion," and cutting tool wear increases. It has been proposed to induce reverse flow or cause clean dielectric fluid to flow to the gap in the same direction as machining is taking place. In this way, the machined surfaces are never exposed to the contaminated fluid.

These reverse flow systems commonly utilize a negative or vacuum pressure to withdraw the contaminated dielectric fluid from the gap area, either through the center of the cutting tool electrode or through an opening provided in the workpiece electrode. The resultant circulation insures that clean dielectric fluid always flows past the machined surfaces.

There are, however, objections to the use of suction because highly combustible gases are often present. If these gases are allowed to accumulate in the system, the sparks occurring during the machining can ignite these gases at any time and produce an explosion. Another objection to the use of suction is the limitation as to the maximum pressure differentials that can be developed relative to atmospheric pressure. This is a pronounced disadvantage since it has been found that by increasing the pressure differential, the flow rate can be increased and accordingly the rate of machining. In a suction system, the magnitude of the negative pressure relative to atmospheric pressure is limited by available equipment and safety requirements. Also a disadvantage is the special pumping equipment demanded both for providing the clean dielectric fluid to the reservoir in which the workpiece electrode is normally mounted and for withdrawing the contaminated fluid.

With these problems in mind, the invention contemplates electrical stock removal apparatus incorporating a unique ionizable fluid flow system for insuring that machined areas are only exposed to clean ionizable fluid; that eliminates the danger from explosions of combustible gases; and that can be installed at a minimum of cost on both new and old apparatus with only a minor alteration.

More specifically, the invention seeks to provide the foregoing apparatus with a novel positive pressure flow system in which only clean dielectric fluid is caused to flow past machined surfaces by developing potentially large pressure differentials so as to thereby achieve increased machining rates.

A related aim of the invention is to provide a pressure chamber in the vicinity of the gap and machined areas and supply thereto clean dielectric fluid which subsequently flows into the machining gap. In this way, contaminated dielectric fluid is always kept away from the machined surfaces and the hazards from potential explosions are eliminated.

Figure 2:
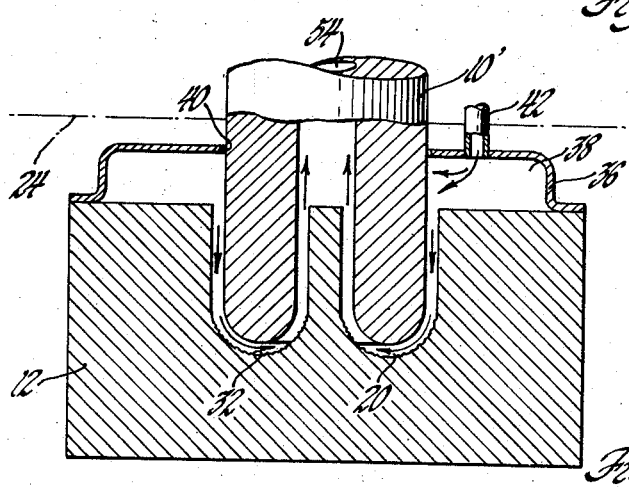

The foregoing and other objects and advantages of the invention will be apparent from the following description and the accompanying drawings in which:

FIGURE 1 is a diagrammatic showing of electrical stock removal apparatus incorporating the principles of the invention; and FIGURE 2 shows a modification of the FIGURE 1 apparatus.

Referring now to the drawings in detail, and particularly to FIGURE 1, the numerals 10 and 12 are used to respectively denote a cutting tool and a workpiece. Gap spacing and machining power may be provided in any known way, such as disclosed in the the U.S. Patent 3,059,150 to Colten et al. Since this patent contains a complete disclosure, this part of the apparatus will only be briefly described.

The cutting tool 10 is maneuvered relative to the workpiece 12 by a servomotor 14. Of course, if preferred, the workpiece 12 can be maneuvered relative to the cutting tool 10 or both can be maneuvered together. The servomotor 14 is controlled by a suitable servo valve 16 that causes pressure fluid to be delivered to the servomotor 14 in order to maneuver the cutting tool 10 in the desired direction. This operation of the servo valve 16 is in turn determined by an appropriate control circuit denoted generally at 18 in a way that causes a certain gap spacing to be maintained between the cutting tool 10 and the workpiece 12. The voltage across a machining gap 20 established between the cutting tool 10 and the workpiece 12 is compared with a desired reference voltage, which is proportional to a predetermined gap spacing, and then the spacing is adjusted by the servomotor 14 so that the actual gap voltage corresponds to the reference voltage.

The workpiece 12 is fixedly positioned within a tank 22 filled with a suitable dielectric fluid to approximately a level shown by the numeral 24. The position of the workpiece 12 is maintained by an appropriate mounting block 26 in the tank 22.

A power supply 27, which also may be of the type disclosed by the aforementioned Patent 3,059,150, is connected across the gap 20 by conductors 28 and 30 extending respectively to the cutting tool 10 and the mounting plate 26. When the power supply 27 is effective, electrical discharges take place across the gap 20 and cause particles to be eroded from the workpiece 12 along a shaded area designated by the numeral 32 in a way well known.

During the machining process, the dielectric fluid becomes contaminated with the eroded particles as they are washed away from the gap 20. If this contaminated dielectric fluid is allowed in the vicinity of a machined surface 34, short circuits occur and the resultant discharges cause the finish to be harmed. Moreover, additional material is secondarily eroded and an undesirable taper results. In order to prevent this, an enclosure member, as a cap 36, is sealingly joined in any appropriate fashion to the workpiece 12 so as to isolate a chamber 38 from the contaminated dielectric fluid in the tank 22. Preferably, an opening 40 in the top of the cap 36 is formed by the electrode 10 itself during the EDM process. This assures a proper clearance between the cutting tool 10 and the cap 36.

Clean dielectric fluid is supplied to an inlet 42 to the chamber 38 by a suitable pump 44 and at a pressure determined by a pressure regulator 46 of conventional construction. The pressure developed by the pump 44 will be at some predetermined amount above atmospheric pressure commensurate with the flow rate wanted. The pump 44 withdraws the contaminated dielectric fluid from the tank 22 via a suction conduit 48 and a filter 50 of a character suitable for filtering the dielectric fluid employed. By having the filter 50 on the suction side or inlet side of the pump 44, the pump 44 is not exposed to the contaminated dielectric fluid and hence, wear is not a problem. Of course, if preferred, the filter 50 can be positioned on the outlet side of the pump 44.

To commence the operation of the fluid system, the pump 44 is rendered operative whereupon clean dielectric fluid is supplied to the chamber 38. This fluid then proceeds along the route shown by the arrows to the gap 20, i.e., in the direction stock is being removed from the workpiece 12. Since the fluid passing the machined surface 34 is clean, the surface finish is not injured nor can secondary erosion take place. To complete the circuit, preferably the workpiece 12 will have been provided with a thru-opening 52 such that the fluid passing through the gap 20 and washing away the eroded particles will be forced by the positive pressure to continue downwardly and through the opening 52 and directly to the tank 22. Since the contaminated fluid in the tank 22 is at atmospheric pressure, any gaseous pockets that form are relatively small and therefore quickly dissipated in the tank 22. From the tank 22 the contaminated fluid, as mentioned, is withdrawn by the pump 44 as required via the suction conduit 48.

In the FIGURE 2 modification, instead of having a thru-opening, such as the opening 52 in the workpiece 12, the electrode is made hollow, as an electrode 10′, in order to define a passage as that identified by the numeral 54. At the upper end, the passage 54 can be altered, e.g., by forming radial openings in the side, so that the fluid passing therethrough will flow into the tank 22. In this embodiment, the clean dielectric fluid under pressure will be supplied to the inlet 42 of the chamber 38 and then will follow the path of the arrows, going first to the gap 20 and causing the eroded particles to be carried away. Because of the positive pressure, the contaminated fluid will be forced upwardly through the cutting tool opening 54 and returned to the tank 22. The pressure at which the system operates and established by the pressure regulator valve 46 will be adequate to force the fluid up through the electrode, and of course will be correlated with the cutting performance desired.

It should be noted that the pressure at which the flow system is to operate and established by the pressure regulator valve 46 will not only be determined by the application, i.e., whether the FIGURE 1 or 2 embodiment is utilized, but also will be determined by the cutting rate desired, keeping in mind that in general an increased flow rate, which occurs when the pressure is increased, will increase the stock removal rate. Also, the pressure will be adequate to prevent the contaminated dielectric fluid from leaking via the cap opening 40 between the tool 10 and 10′ and into the chamber 38. Additionally, the pressure will be adequate to compensate for the leakage of dielectric fluid via the cap opening 40 between the tool 10 and 10′ and into the chamber 38.

From the foregoing, it can be appreciated now that the invention affords a very simple way of utilizing existent positive pressure systems for inducing flow of clean dielectric fluid past those surfaces on the workpiece that have been machined to the desired size. This involves the addition of a cap 36 that may be joined to the workpiece by welding or any other suitable method so as to provide an adequate seal. Hence, the pressure differential can be as large as wanted as distinguished from suction systems where several factors including the commercially available equipment limit the pressure differentials attainable. The continuous flow of fluid facilitates the cutting rate without interfering with the machined surfaces so that the accuracy of the apparatus is considerably increased. This is all accomplished without any resort to complex suction systems or circuitry that would necessarily be extremely costly. Also, the explosion hazard is eliminated by using a positive pressure system, whereas in suction systems the lower pressures particularly at the point where the contaminated fluid leaves the gap encourage the formation of larger gas pockets. These larger gas pockets are more difficult to dissipate and in fact tend to remain in the gap area where they can be ignited by the sparks and produce the undesired explosions.

The invention is to be limited only by the following claims.

I claim:

1. An ionizable fluid flow system for electrical stock removal apparatus of the character adapted to cause stock to be machined from a workpiece electrode by electrical discharges generated across a gap formed between a cutting tool electrode and the workpiece electrode comprising a source of clean ionizable fluid, and means producing a fluid pressure differential across the gap so as to promote flow of the clean ionizable fluid from the source through the gap in the direction stock is being machined and of a character that reduces the hazard of explosions from gas pocket formations in the fluid, the pressure differential producing means including an enclosure adjacent the gap and communicating with the source.

2. Apparatus for generating electrical stock removing discharges across an ionizable fluid filled gap formed between cutting tool and workpiece electrodes comprising means feeding the electrodes relative to each other, a source of clean ionizable fluid, and means producing a fluid pressure differential across the gap so as to cause the circulation of clean fluid from the source through the gap in the direction stock is removed from the workpiece electrode, the pressure differential producing means including enclosure means communicating with the source and so arranged relative to the gap that only clean fluid in proceeding to the gap flows past areas on the workpiece electrode from which stock has been removed.

3. Apparatus for generating electrical stock removing discharges across an ionizable fluid filled gap formed between cutting tool and workpiece electrodes comprising means supplying clean ionizable fluid to the gap for aiding in the removal of eroded particles from the workpiece electrode, the supplying means including a source of relatively clean ionizable fluid, and a pressure chamber communicating with the source and so arranged relative to the gap as to cause only clean fluid to be supplied to the gap and only past areas on the workpiece electrode from which stock has been removed to thereby minimize the distortion of the areas from which the stock has been removed due to the presence of contaminated fluid containing eroded particles and also cause any gas pockets that form in the contaminated fluid to be quickly removed from the gap and dissipated to reduce explosion hazards.

4. Apparatus for generating electrical stock removing discharges across a dielectric fluid filled gap formed between cutting tool and workpiece electrodes comprising a reservoir, a source of clean dielectric fluid, means producing a fluid pressure differential across the gap so as to cause the circulation of clean fluid to be in the direction stock is removed from the workpiece electrode, the pressure differential producing means including a pressure chamber communicating with the source and so arranged relative to the gap that only clean fluid in proceeding to the gap flows past areas on the workpiece electrode from which stock has been removed, and means facilitating the transfer of contaminated fluid containing the eroded particles from the gap to the reservoir so as to quickly remove from the gap and dissipate any gas pockets that form thereby reducing explosion hazards.

5. Apparatus for generating electrical stock removing discharges across a dielectric fluid filled gap formed between cutting tool and workpiece electrodes comprising a source of relatively clean dielectric fluid under pressure, a reservoir containing dielectric fluid and having the workpiece electrode immersed therein, and means producing a fluid pressure differential across the gap so as to cause the circulation of clean fluid from the source to be in the direction stock is removed from the workpiece, the pressure differential producing means including a pressure chamber associated with the workpiece electrode, the pressure chamber communicating with the source and being so arranged relative to the gap that only clean fluid in proceeding to the gap flows past areas on the workpiece electrode from which stock has been removed, and means facilitating the return of contaminated fluid containing the eroded particles from the gap to the reservoir so as to quickly remove from the gap and dissipate any gas pockets that form thereby reducing explosion hazards.

6. Apparatus for generating electrical stock removing discharges across a dielectric fluid filled gap formed between cutting tool and workpiece electrodes comprising a reservoir filled with dielectric fluid and having the workpiece electrode submerged therein, a pressure chamber surrounding the gap, means delivering dielectric fluid from the reservoir under pressure to the pressure chamber so that dielectric fluid is caused to flow in the direction stock is being removed from the workpiece electrode and also so that any gas pockets that form are quickly removed from the gap and dissipated.

7. Apparatus for generating electrical stock removing discharges across a dielectric fluid filled gap formed between cutting tool and workpiece electrodes comprising a reservoir filled with dielectric fluid and having the workpiece electrode submerged therein, an enclosure member joined to the workpiece electrode and having the cutting tool electrode extending therein, a fluid pressure pump having the outlet thereof joined to the enclosure member and the inlet thereof connected to the reservoir, a filter associated with the pump, the enclosure member being so arranged that filtered fluid under pressure is caused to flow to the gap in the direction stock is being removed from the workpiece electrode, and means facilitating the return of contaminated fluid containing eroded particles from the gap to the reservoir which is at atmospheric pressure so that any gas pockets that form are quickly removed from the gap and dissipated in the reservoir thereby reducing explosion hazards.

8. Apparatus for generating stock removing discharges across a dielectric fluid filled gap formed between cutting tool and workpiece electrodes comprising a reservoir filled with dielectric fluid and having the workpiece electrode submerged therein, an enclosure member joined to the workpiece electrode and having the cutting tool electrode extending therein, the enclosure member being submerged also in the fluid and effective to seal the gap from the dielectric fluid in the reservoir, a fluid pressure pump having the inlet and the outlet thereof, respectively, connected to the enclosure member and the reservoir, a filter associated with the pump, the enclosure member being so arranged that only filtered fluid under pressure is delivered to the gap and in the direction stock is being removed from the workpiece electrode, the workpiece electrode having an opening therein so that contaminated fluid in the gap containing the eroded particles may flow therethrough and back to the reservoir.

9. Apparatus for generating stock removing discharges across a dielectric fluid filled gap formed between cutting tool and workpiece electrodes comprising a reservoir filled with dielectric fluid and having the workpiece electrode submerged therein, an enclosure member joined to the workpiece and having the cutting tool electrode extending therein, a fluid pressure pump having the inlet and outlets thereof connected, respectively, to the enclosure member and the reservoir, a filter associated with the pump so that filtered fluid under pressure is supplied by the pump to the enclosure member, the enclosure member being so arranged that only the filtered fluid is supplied to the gap at a predetermined positive pressure and in the direction stock is being removed from the workpiece electrode, the cutting tool electrode having an opening therein so arranged that the contaminated fluid in the gap and having the eroded particles therein is caused to flow through the cutting tool electrode and back to the reservoir, which is at atmospheric pressure, thereby quickly dissipating any gas pockets that form and reducing the hazard from explosions of the gas pockets.

References Cited in the file of this patent

UNITED STATES PATENTS 2,818,490  Dixon et al. _____ Dec. 31, 1957